United States Patent
Galasso et al.

(10) Patent No.: US 9,027,947 B2
(45) Date of Patent: May 12, 2015

(54) METHODS AND APPARATUS RELATED TO A UNITARY FORK BRACE

(75) Inventors: Mario Galasso, Watsonville, CA (US); William M. Becker, Aptos, CA (US); Andrew Laird, Soquel, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 1018 days.

(21) Appl. No.: 12/412,199

(22) Filed: Mar. 26, 2009

(65) Prior Publication Data
US 2009/0243251 A1 Oct. 1, 2009

Related U.S. Application Data

(60) Provisional application No. 61/039,497, filed on Mar. 26, 2008.

(51) Int. Cl.
B62K 21/02 (2006.01)
B62K 19/30 (2006.01)
B62K 21/04 (2006.01)
B62K 25/08 (2006.01)

(52) U.S. Cl.
CPC .............. *B62K 21/02* (2013.01); *B62K 21/04* (2013.01); *B62K 25/08* (2013.01)

(58) Field of Classification Search
CPC ........ B62K 19/02; B62K 19/48; B62K 21/02; B62K 21/04
USPC .............. 280/276, 279, 280, 274, 281.1, 288, 280/288.3
See application file for complete search history.

(56) References Cited

U.S. PATENT DOCUMENTS

| | | | | |
|---|---|---|---|---|
| 345,465 | A * | 7/1886 | Waite | 280/279 |
| 589,147 | A * | 8/1897 | Sturges | 280/280 |
| 609,937 | A * | 8/1898 | Kelly | 280/280 |
| 660,875 | A * | 10/1900 | Wambach | 280/279 |
| 1,998,992 | A * | 4/1935 | Johnson et al. | 280/280 |
| 4,971,344 | A * | 11/1990 | Turner | 280/276 |
| 5,011,172 | A * | 4/1991 | Bellanca et al. | 280/281.1 |
| 5,016,895 | A * | 5/1991 | Hollingsworth et al. | 280/280 |
| 5,078,417 | A * | 1/1992 | Mouritsen | 280/280 |
| 5,464,240 | A * | 11/1995 | Robinson et al. | 280/281.1 |
| 5,653,007 | A * | 8/1997 | Boyer et al. | 29/460 |
| 5,791,673 | A | 8/1998 | Patterson | |
| 5,803,477 | A * | 9/1998 | Reisinger | 280/284 |
| 5,913,529 | A | 6/1999 | Patterson | |
| 6,607,185 | B2 * | 8/2003 | Graves et al. | 267/64.26 |
| RE38,669 | E * | 12/2004 | Voss et al. | 280/276 |
| 7,073,807 | B2 * | 7/2006 | Masui | 280/276 |
| 7,464,950 | B2 * | 12/2008 | Schuman et al. | 280/279 |
| 7,621,549 | B2 * | 11/2009 | van Houweling | 280/288.4 |
| 8,104,782 | B2 * | 1/2012 | Achenbach | 280/276 |
| 2006/0169689 | A1 * | 8/2006 | Carnevali et al. | 220/4.21 |
| 2007/0257466 | A1 * | 11/2007 | Murphy et al. | 280/276 |
| 2008/0035431 | A1 * | 2/2008 | Vroomen et al. | 188/24.21 |

FOREIGN PATENT DOCUMENTS

EP 2181918 A2 * 5/2010
JP 11198881 A * 7/1999

* cited by examiner

*Primary Examiner* — Joseph Rocca
*Assistant Examiner* — Daniel Yeagley
(74) *Attorney, Agent, or Firm* — Patterson & Sheridan, LLP; David M. Haugen

(57) ABSTRACT

Embodiments of a fork brace for a bicycle are disclosed herein. In one aspect, a brace portion is integrally formed along with two tubular fork members and an overlay fits in a mating relationship with the brace portion to create a unitary, tubular brace.

20 Claims, 7 Drawing Sheets

METHODS AND APPARATUS RELATED TO A UNITARY FORK BRACE

CROSS-REFERENCE TO RELATED APPLICATIONS

This application claims benefit of U.S. provisional patent application Ser. No. 61/039,497, filed Mar. 26, 2008, which is herein incorporated by reference.

FIELD OF THE INVENTION

Embodiments of the invention generally relate to methods and apparatus for use in vehicle suspension. Particular embodiments of the invention relate to methods and apparatus useful for structural reinforcement of suspension components, more particularly, reinforcement of front forks using a brace comprising a base portion and an overlay portion to produce a rigid structural unit.

BACKGROUND OF THE INVENTION

Vehicle suspension systems typically include structures that must resist forces tending to twist and/or bend those structures. Further, it is desirable that such structures be maintained in position relative to one another. That often means that the structures and/or their connection to one another need to be suitably reinforced. In many applications, it is also desirable to minimize the weight of vehicle components, including suspension components, in order to increase performance. What is needed is a structural reinforcement that is lightweight yet suitably rigid in application. Front forks for bicycles are an example of a component requiring rigidity in order to operate effectively. Each fork is connected at a lower end to an axle and at an upper end to a fork crown. However, as fork travel has been extended, an additional reinforcement has been added in the form of a fork brace extending between the lower fork legs of the front fork suspension unit. FIG. 1 is a Figure of a fork 10 and illustrates the brace 15 extending between the fork legs 20, 25. In the fork of FIG. 1, the fork legs are tubular and the brace is integrally formed between them in order to provide rigidity and keep the forks parallel to one another. The purpose of the brace 15 is to help maintain the fork legs in a substantially parallel relationship while they are being subjected to rider and terrain induced disparate loads.

FIG. 2 is a rear view of an integral brace 15 formed between fork legs 20, 25 and illustrates reinforcement webs 35 used in the brace. Because the fork assembly, including the brace portion is typically cast in one piece, manufacturing limitations prevent the brace from being formed into a tubular shape along with the two tubular forks legs. Instead, the brace 15 has a hollow back portion 30 that includes integral, web-like structures 35. The result is a reasonably rigid brace having additional weight due to the extra webs required to impart rigidity and having no contoured, attractive appearance when viewed from the rear. Such a brace does therefore fail to maximize rigidity between fork leg members while minimizing extra weight associated with such support.

There is a need therefore, for a fork brace that makes use of a tubular cross section even when a portion of the brace is integrally formed with tubular fork legs. There is yet a further need for a fork brace that provides a more contoured, attractive appearance from all angles.

DRAWINGS

SUMMARY OF THE INVENTION

Embodiments of a fork brace for a bicycle are disclosed herein. In one aspect, a brace portion is integrally formed along with two tubular fork members and an overlay fits in a mating relationship with the brace portion to create a unitary, tubular brace.

DESCRIPTION OF A PREFERRED EMBODIMENT

Figure 1:
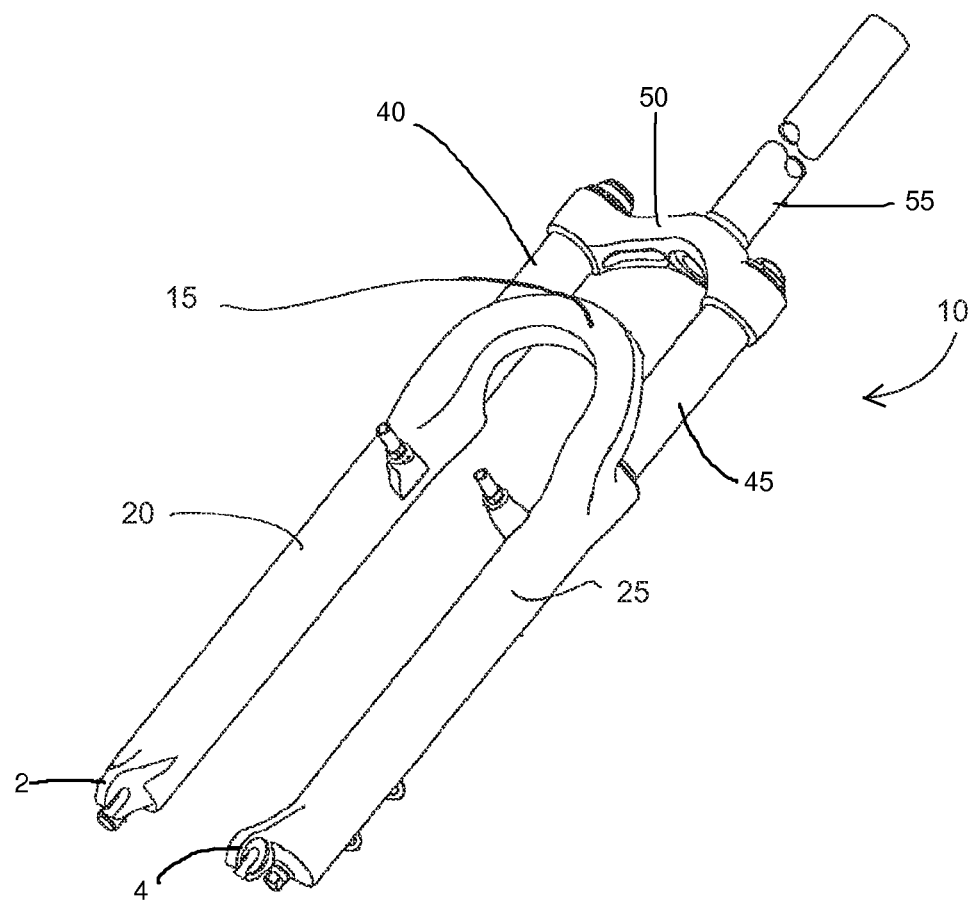
FIG. 1 shows a fork assembly with a brace between the fork legs.
Figure 2:
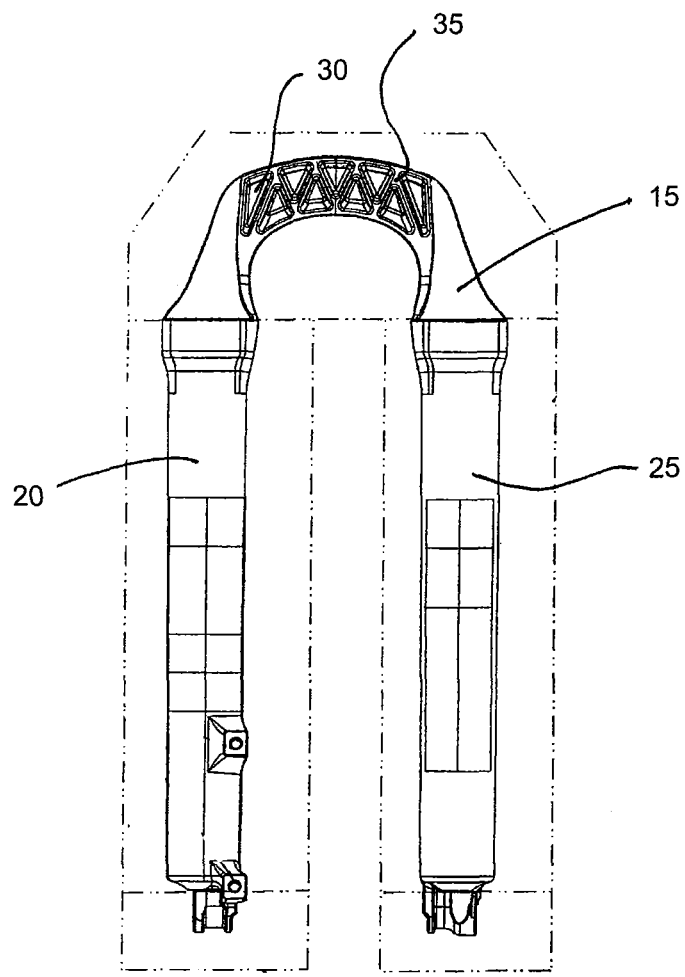
FIG. 2 is a rear view of a brace and illustrates structural reinforcement of the brace.
Figure 3:
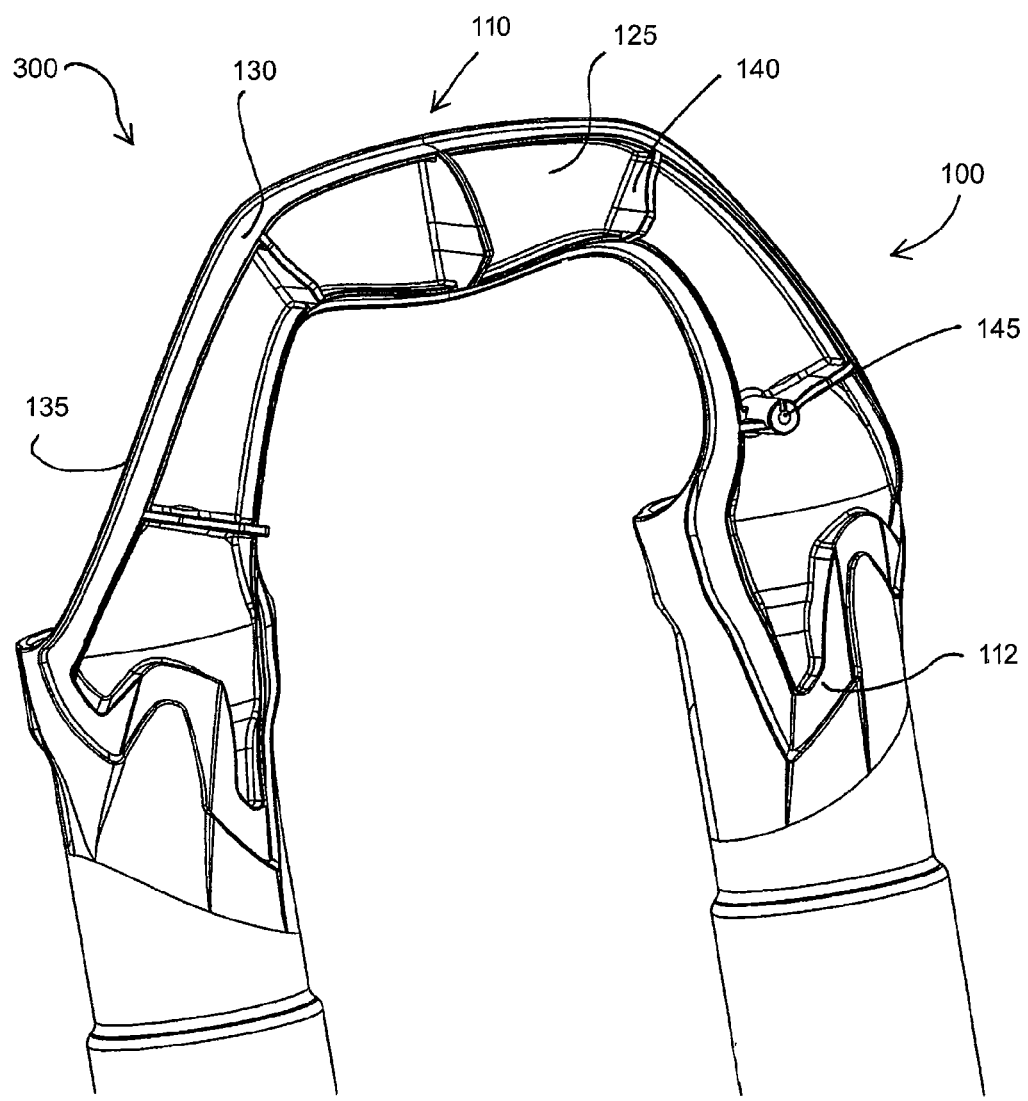
FIG. 3 is a front view of the fork assembly with a rear portion of a brace integrally formed therebetween.
Figure 4:
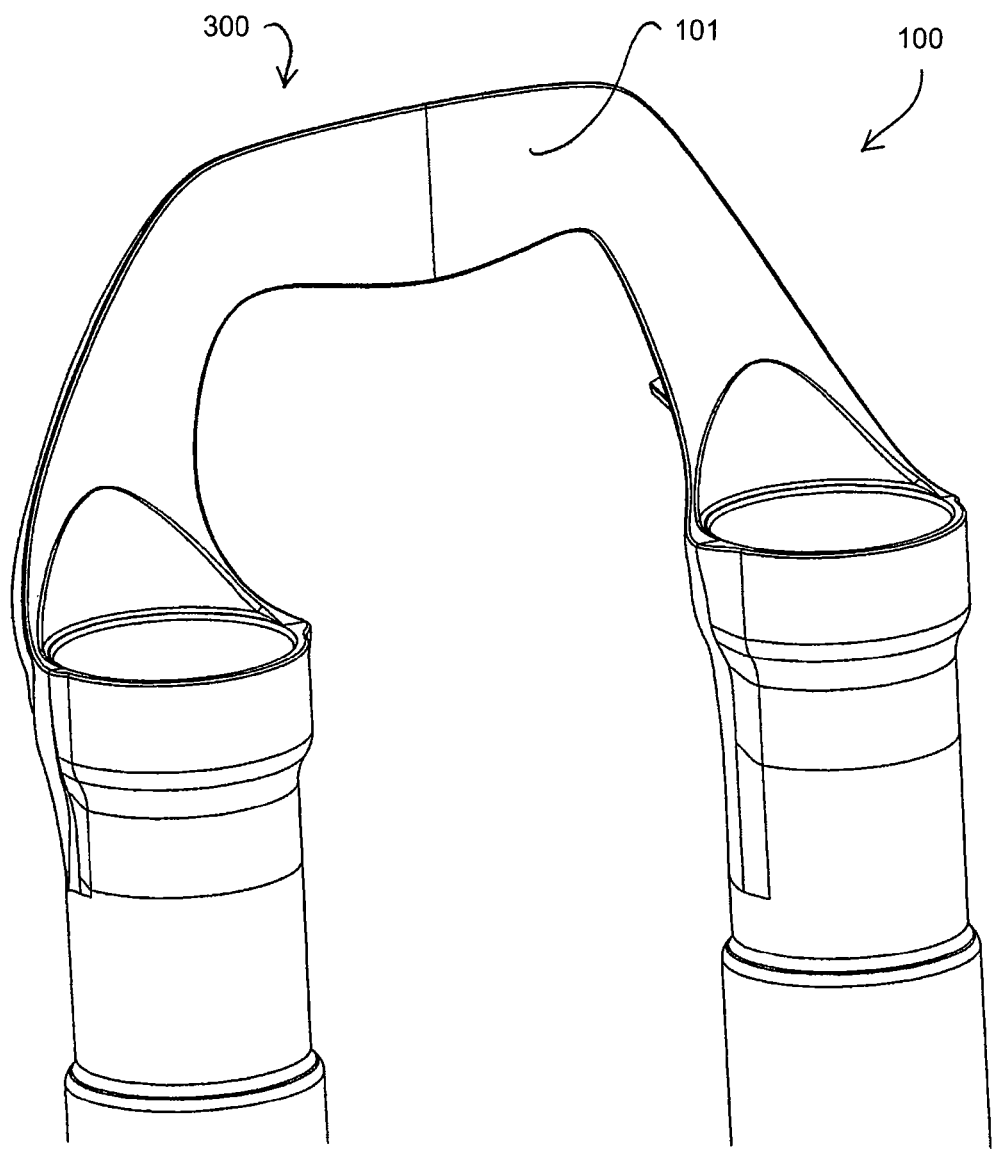
FIG. 4 is a rear view of a fork assembly including an embodiment of the brace.

In one embodiment a two wheeled vehicle such as a bicycle or motorcycle includes a suspension structure comprising a pair of lower, front suspension fork legs connected by a brace. FIG. 1 illustrates a suspension structure wherein fork legs 20, 25 telescopically receive mating tubes 40, 45, which are connected by a crown 50. A brace 15 extends between the fork legs 20, 25, and a steerer tube 55 is supported by the crown 50, and connects the suspension structure to the vehicle. Each fork leg 20, 25, includes an axle receiver 2, 4 for connection to an axle of a vehicle. FIG. 3 is a front view showing the front fork assembly 100 with a portion 110 of a brace 300 integrally formed between the fork legs. In the embodiment shown, the brace portion 110 is formed at the same time as the fork legs and of the same metallic material and includes a surface 125 and sides 130 extending around the perimeter of the surface 125. In another embodiment the brace portion 110 may be formed separately from the fork legs, and/or of a different material, and attached thereto. Because it is designed to be used with an overlay (e.g. 200), the portion 110 is formed with an essentially "open" front. The portion 110 also includes a lip 135 formed around its outer perimeter to permit the overlay to be seated, as will be described. Also included are reinforcement members 140 extending from the rear surface past a top edge of the sides 130 and outwardly corresponding to an interior dimension of the assembled brace (with overlay) to add additional rigidity and/or facilitate a connection between the portion and the overlay. In the embodiment shown, a threaded boss 145 is formed in the rear portion to receive a threaded fastener. FIG. 4 is a rear view of the fork assembly of FIG. 3 and shows a smooth, contoured rear surface 101 of the portion 110.

The portion 110 of the brace 300 and the lower fork legs are preferably made of castable material like magnesium, aluminum or titanium but can be made of fiber reinforced polymer (e.g. carbon and/or glass reinforced epoxy or PEEK or other polyarylenes) or any other suitable structural material providing a suitably high level of strength, stiffness and impact resistance or any suitable combination thereof.

Figure 5:
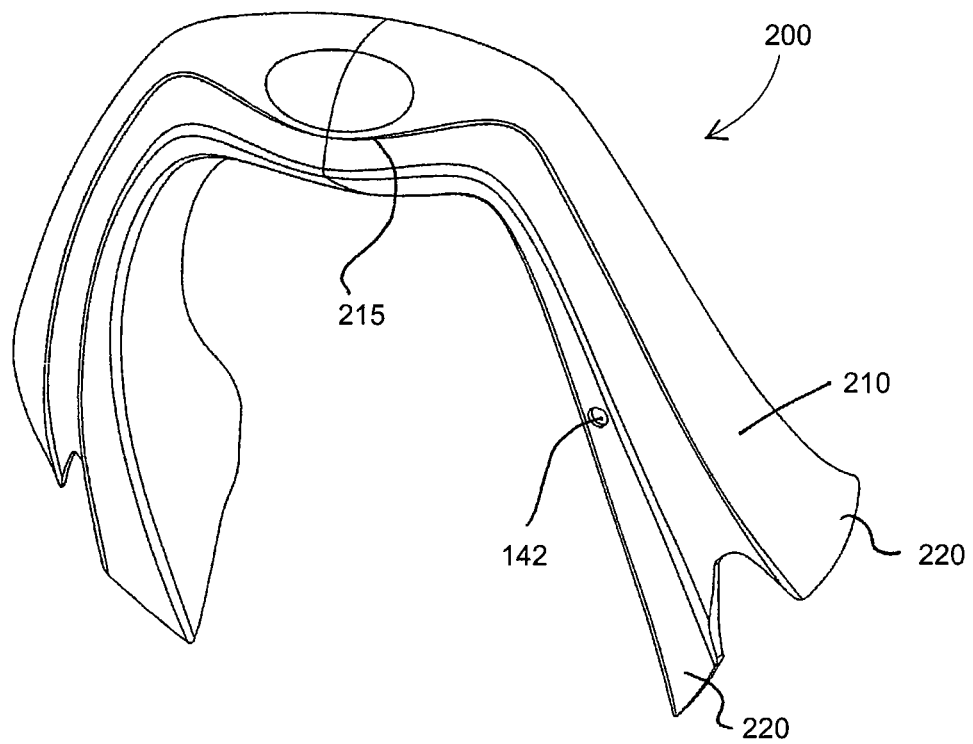
FIG. 5 is a top view of an overlay portion.

FIG. 5 is a front view of an overlay 200 that is designed to fit in a mating relationship over the portion 110 of the brace 300 to create a unitary, structural brace assembly with a substantially tubular cross-section. While the brace 300 is described as having a "tubular" cross section, it is understood that the term "tubular" in this specification relates to any shape that includes a substantially closed or boxed cross-section and is not limited to any particular tubular shape.

Figure 6:
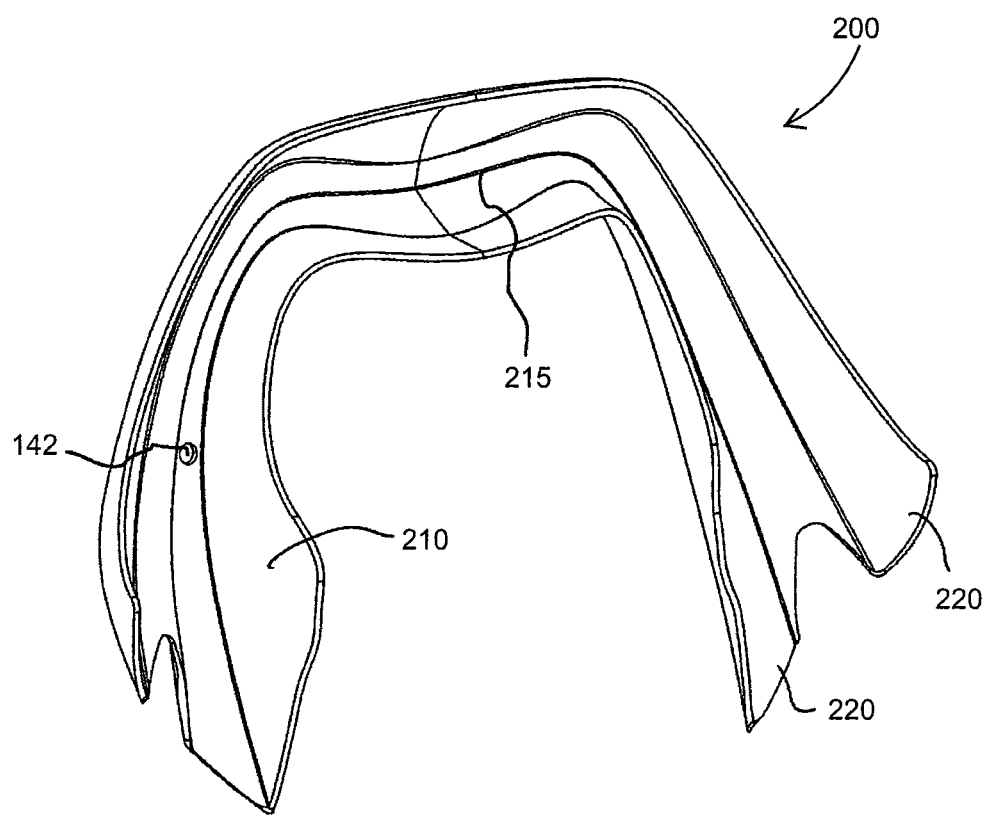
FIG. 6 is a rear view of an overlay portion showing the underside thereof.

FIG. 6 is a rear view of the overlay portion of FIG. 5 showing the underside thereof. As illustrated by the Figures, the overlay 200 is formed with sides 210 constructed and arranged to fit over the sides 130 of the rear portion 110 and having a thickness that, upon assembly, abuts the lower lip 135 that extends around the perimeter of portion 110. In cross section, the overlay 200 has a semi-triangular shape with both sides 210 intersecting to form a crest 215 that provides stiffness and strength to the overlay, especially when it is combined with the rear portion 110. In the embodiment shown, the overlay 200 includes contoured ends 220 that mate with similar formations 112 formed in the rear portion and on the front of the lower fork legs (see FIG. 3). Also included is a formed aperture 142 for receiving a threaded or other fastener (e.g., screw) to facilitate the connection of the overlay to the threaded boss 145 formed in the portion.

The overlay is preferably made of a different material than the fork assembly and in one embodiment is preferably moldable. Optionally the overlay may be made by vacuum bagging, pressing, lay up, in mold lay up, casting or other suitable manufacturing method or combination thereof. While the overlay may be made of a metallic material like magnesium, aluminum, or titanium, it preferably comprises fiber reinforced polymer (e.g. carbon or glass reinforced thermoset or thermoplastic polymer such as for example epoxy or Polyetheretherketone ("PEEK") respectively) or any other suitable structural material, reinforcement or combination thereof. The carbon fiber/epoxy of the overlay may be prepreg fabric and may consist of high or low modulus carbon fiber or any suitable combination thereof. The carbon fiber may be in a woven fabric form, mat fabric form, may be preferentially oriented using unidirectional fiber reinforcement in anticipation of greater stresses in given orientations or may comprise any suitable combination of the foregoing.

Figure 7:
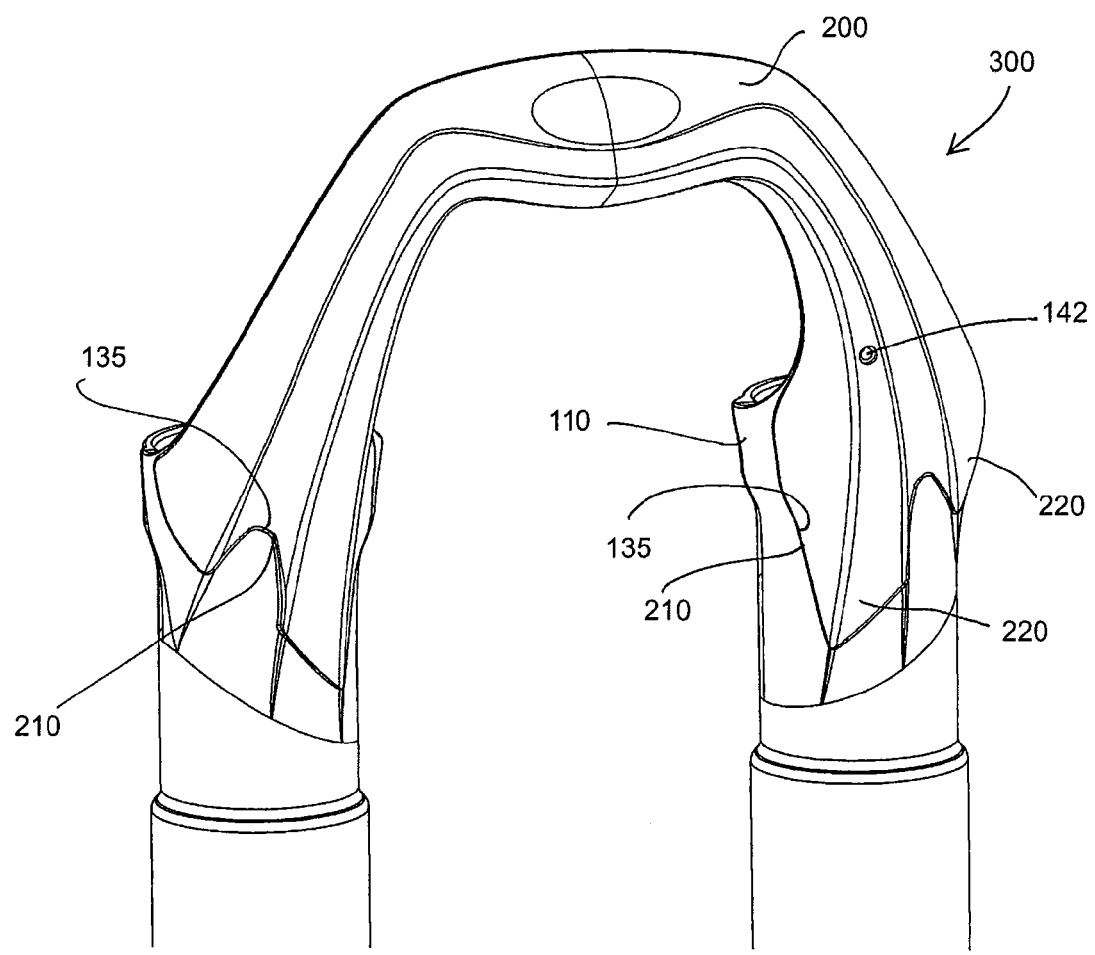
FIG. 7 shows the rear portion and overlay portion mated together to form the brace.

FIG. 7 shows the rear portion 110 and overlay 200 mated together to form the completed brace 300. As shown, the lower edge of the overlay sides 210 fit on the lower lip 135 of the rear portion to make a substantially continuous, supporting connection therebetween. Additionally, the contoured interior surface of the overlay sides 210 (visible in FIG. 6, the rear view of the overlay 200) are at least partially supported by the sloped outer surface of sides 130 of the rear portion 110 (visible in FIG. 3, rear view of the fork assembly). In one embodiment each reinforcement 140 extending from the rear surface 125 contacts an inner surface of the overlay and provides additional support for the overlay and the assembly.

In one embodiment, the rear portion 110 and overlay 200 are glued together with an adhesive material applied around the perimeter of the sides 130 and where the overlay sides 210 meet lip 135 in order to provide a continuous, adhesive connection between both portions of the brace assembly 300. Additionally, the outer edge of each reinforcement 140 is coated with adhesive to create an adhesive arrangement at each point where the reinforcement 140 contacts the inner surface of the overlay 200. Adhesives may include epoxies, cyanoacrylates or other suitable adhesive materials. In one embodiment, the overlay 200 and the rear portion 110 both comprise metal and the assembly is welded. In one embodiment the overlay 200 and the rear portion 110 both comprise thermoplastic and the assembly is thermoplastic welded. In one embodiment both the rear portion 110 and the overlay 200 comprise particulate metal and the assembly is sintered. In one embodiment the overlay 200 is bonded to the rear portion using a heat activated bonding agent (e.g. polar molecule) suitable for action between the overlay material and the rear portion material. Depending on the composition of the overlay 200 and the rear portion 110 any suitable method or material may be used for assembling the brace 300. Also visible in FIG. 7 is aperture 142 leading to threaded boss 145. In this embodiment, the connection between the rear portion and overlay can be further reinforced with a threaded member (such as for example a headed machine screw).

In one embodiment the connection between the overlay 200 and the rear portion 110 is mechanical. In one embodiment the connection comprises rivets. In one embodiment, rather than mating directly along a lip 135 of the rear portion 110, the rear portion may include a channel (not shown) formed around its base in which case the lower edge of the overlay 200 fits within the channel. The channel may have a width slightly smaller than the thickness of edge (and optionally edge 210 may include an "arrow" shaped cross section where channel includes an inverse "arrow" shaped cross section) so that the fit overlaps and/or interferes. Alternatively, the channel may be formed along the lower edge of the overlay 200 and a lip formed around the rear portion 110 could extend into the channel of the overlay 200. Any suitable overlap or blend between the overlay 200 and the rear portion 110 may be used to facilitate a structural connection between the two components. Optionally the overlay 200 may be joined to the rear portion by interference fit, pressure fit, sonic welding or any other means known in the art or connecting similar materials to form a robust connection there between. Optionally, a void formed in the interior of the tubular brace may be filled with a light weight, structural foam. Such form would provide additional structural support and may also serve to connect (e.g. adhere) the overlay 200 to the rear portion 110.

As illustrated in FIG. 7, when fitted together, the overlay and the base are structurally connected to form a unitary, tubular brace between the fork legs that is visually pleasing and/or aerodynamically efficient when viewed from the front or the rear. While not illustrated, the relative positions of the brace portion and the overlay could be reversed whereby the brace portion is disposed at a front end of the fork assembly with an "open" rear for receiving the overlay. The result is, in any case, a unitary, tubular brace with a portion thereof integrally formed between two fork legs.

While the foregoing is directed to embodiments of the present invention, other and further embodiments of the invention may be devised without departing from the scope thereof, and the scope thereof is determined by the claims that follow.

The invention claimed is:

1. A vehicle front fork assembly comprising:
 a brace portion having a first and second tubular fork member formed one at each end of the brace portion, the tubular fork members accepting and operating telescopically with mating tubes, the brace portion having an open portion opposite a surface, sides extending around a perimeter of the surface, at least one reinforcement member extending outwards from the surface towards an upper edge of the sides, a lip formed around an outer perimeter of the sides, and the fork members parallel to each other; and
 an overlay having sides with a bottom edge at an end thereof constructed and arranged to be mated with the open portion of the brace portion by fitting the lip and an outer surface of the sides of the brace portion with the bottom edge and an interior surface of the sides of the overlay, and forming a closed brace having a substantially tubular cross-section.

2. A vehicle suspension fork comprising:
a brace portion having a first and second tubular fork member formed one at each end of the brace portion, the brace portion having an open portion opposite a surface, sides extending around a perimeter of the surface, at least one reinforcement member extending outwards from the surface towards an upper edge of the sides, a lip formed around an outer perimeter of the sides, and the fork members parallel to each other;
an overlay having sides with a bottom edge at an end thereof constructed and arranged to be mated with the open portion of the brace portion by fitting the lip and an outer surface of the sides of the brace portion with the bottom edge and an interior surface of the sides of the overlay, and forming a closed brace having a substantially tubular cross-section;
a first mating tube telescopically received by the first tubular fork member;
a second mating tube telescopically received by the second tubular fork member;
a crown connecting the first mating tube to second mating tube; and
a steerer tube connected to the crown at one end and a vehicle at a second end.

3. The vehicle suspension fork of claim 2, wherein the brace portion and the fork members are formed as an integral unit.

4. The vehicle suspension fork of claim 2, wherein the brace portion is formed of a metallic material.

5. The vehicle suspension fork of claim 2, wherein the brace portion is formed of a material selected from a group of at least one of magnesium, aluminum and titanium.

6. The vehicle suspension fork of claim 2, wherein the overlay is formed of non-metallic material comprising at least one of fabric, mat, directional fiber, and thermoplastic composite.

7. The vehicle suspension fork of claim 2, wherein the overlay comprises a fiber reinforced polymer.

8. The vehicle suspension fork of claim 2, where a tubular interior is formed within the closed brace.

9. The vehicle suspension fork of claim 2, wherein an interior of the closed brace is filled with a foam.

10. The vehicle suspension fork of claim 2, wherein the brace portion further includes a channel formed on an outer perimeter thereof for supporting the bottom edge of the overlay.

11. The vehicle suspension fork of claim 2, wherein the at least one reinforcement member extends outwards past the upper edge of the sides, the reinforcement member for contact with the interior surface of the sides of the overlay.

12. The vehicle suspension fork of claim 2, wherein the overlay is attached to the brace portion with an adhesive.

13. The vehicle suspension fork of claim 2, wherein the overlay is attached to the brace portion with at least one fastener.

14. The vehicle suspension fork of claim 2, wherein the overlay is attached to the brace portion by welding.

15. The vehicle suspension fork of claim 2, wherein the brace portion is disposed at a front end of a front fork assembly and the open portion of the brace portion faces a rear end of the front fork assembly.

16. The vehicle suspension fork of claim 2, wherein the at least one reinforcement member is mated with the interior surface of the sides of the overlay.

17. The vehicle suspension fork of claim 2, wherein the at least one reinforcement member bridges the sides extending around the perimeter of the surface.

18. The vehicle suspension fork of claim 2, wherein the interior surface of the sides of the overlay fits on the outer surface of the sides of the brace portion to make a substantially continuous connection.

19. The vehicle suspension fork of claim 2, wherein the open portion terminates in a contoured formation at each end of the brace portion.

20. A vehicle fork assembly comprising:
a first leg and a second leg wherein the first leg comprises a first axle receiver and the second leg comprises a second axle receiver;
a crown connecting the first leg to the second leg;
a brace connecting a portion of the first leg to a portion of the second leg, the brace having an open portion opposite a surface, sides extending around a perimeter of the surface, at least one reinforcement member extending outwards from the surface towards an upper edge of the sides, a lip formed around an outer perimeter of the sides;
an overlay having sides with a bottom edge at an end thereof constructed and arranged to be mated with the open portion of the brace portion by fitting the lip and an outer surface of the sides of the brace portion with the bottom edge and an interior surface of the sides of the overlay to form a closed substantially tubular cross-section; and
a steerer tube connected to the crown.

* * * * *